United States Patent [19]

Sfredda

[11] Patent Number: 4,520,693
[45] Date of Patent: Jun. 4, 1985

[54] HIGH RATIO DRIVE

[76] Inventor: Albert P. Sfredda, 2106 Iris Pl., Bethlehem, Pa. 18018

[21] Appl. No.: 309,240

[22] Filed: Oct. 7, 1981

[51] Int. Cl.³ .......................... F16H 1/28; F16H 13/06
[52] U.S. Cl. ........................................ 74/804; 74/798
[58] Field of Search ................ 74/804, 805, 801, 798, 74/769, 785, 788, 796, 721, 690

[56] References Cited

U.S. PATENT DOCUMENTS

| | | | |
|---|---|---|---|
| 2,170,591 | 8/1939 | Perry | 74/804 |
| 3,004,453 | 10/1961 | Lang | 74/804 |
| 3,056,315 | 10/1962 | Mros | 74/805 |
| 3,192,799 | 7/1965 | Pamplin | 74/805 |
| 3,324,746 | 6/1967 | Kari | 74/804 |
| 3,381,549 | 5/1968 | Hirakawa | 74/804 |
| 3,413,896 | 12/1968 | Wildhaber | 74/805 X |
| 4,050,331 | 9/1977 | Braren | 74/804 |
| 4,112,788 | 9/1978 | Sfredda | 74/804 |
| 4,184,388 | 1/1980 | Sfredda | 74/793 |
| 4,271,726 | 6/1981 | Ryffel | 74/805 |

FOREIGN PATENT DOCUMENTS

| | | | |
|---|---|---|---|
| 845252 | 6/1952 | Fed. Rep. of Germany | 74/804 |
| 859552 | 10/1952 | Fed. Rep. of Germany | 74/804 |
| 613071 | 11/1926 | France | 74/805 |
| 1236264 | 6/1960 | France | 74/805 |

OTHER PUBLICATIONS

"Design Engineering", Magazine, Oct. 1980 issue, p. 55; Jan. 1981 issue, p. 49.

Compudrive Corp. Brochure, "Gearless Speed Reductions".

Primary Examiner—Allan D. Herrmann
Assistant Examiner—Stephen B. Andrews

[57] ABSTRACT

A high ratio drive wherein a housing supports a first fixed annular toothed raceway and rotatably supports a second axially aligned toothed raceway. A coupled pair of axially aligned toothed wheels are disposed within and having rolling contact and tooth interengagement with the toothed raceways, respectively. The housing supports a rotatable output shaft that is secured concentrically to the second toothed wheel. A rotatable drive shaft having drive spokes secured thereto is supported by the housing in axial alignment with the output shaft. The drive spokes contact the bores of roller bearings that are mounted in each toothed wheel. Rotation of the drive shaft will cause the drive spokes to impart a radial drive force to the toothed wheels thereby forcing them to roll on their respective toothed raceways. This transmits differential rotation to the second toothed raceway and output shaft at a high ratio.

A modified form of the drive has a toothed wheel eccentrically disposed in a fixed toothed raceway. An output shaft supported for rotation concentrically to a toothed raceway, an arm is secured to the output shaft, the outer end of the arm supports a roller that is radially movable within a slot disposed on toothed wheel. Uniform rotation of the toothed wheel will transmit non-uniform angular motion to the output shaft at a high ratio.

6 Claims, 7 Drawing Figures

HIGH RATIO DRIVE

FIELD OF THE INVENTION

This present invention relates to torque transmission devices. It relates particularly to high ratio drives.

PRIOR ART

This invention provides improvements to my patented power transmission device (U.S. Pat. No. 4,112,788). I have improved the ratio range of the drive by employing differential gearing with rolling contact sharing the tooth loads. I have invented novel means for improving the coefficient of traction to further increase the torque capacity and compactness. A modified form of the drive transmits uniform input motion to accurate non-uniform angular motion. Novel means are provided for accurately aligning the teeth in the drive train to produce a zero backlash drive.

SUMMARY OF THE INVENTION

This invention provides a high ratio drive that employs improved differential planetary gearsets that have rolling contact. According to the invention, a housing supports a first fixed annular toothed raceway and rotatably supports a second axially aligned toothed raceway. A torque rigid flexible coupling joins a pair of axially aligned toothed wheels that are disposed within and have rolling contact and tooth interengagement with the toothed raceways, respectively. The housing supports a rotatable output shaft that is secured concentrically to the second toothed wheel. A rotatable drive shaft having drive spokes secured thereto is supported by the housing in axial alignment with the output shaft. The drive spokes engage the bores of the roller bearings that are concentrically mounted in each toothed wheel. Rotation of the drive shaft will cause the drive spokes to impart a radial drive force to the toothed wheels thereby forcing them to roll on their respective toothed raceways. This transmits differential rotation to the second toothed raceway and output shaft at a high ratio.

A modified form of the drive has a toothed wheel eccentrically rotated on a fixed toothed raceway. An output shaft is supported for rotation concentrically to the toothed raceway, an arm is secured to the output shaft, the outer end of the arm supports a roller that is radially movable within a slot disposed on the toothed wheel. Uniform rotation of the toothed wheel will transmit non-uniform angular motion to the output shaft at a high ratio.

Various novel drive means connecting the drive shaft to the driven toothed wheels permit the toothed wheels to be radially movable to follow the exact fine contour irregularities of the toothed raceway thereby increasing the alignment accuracy of the meshing teeth.

A modified form of the drive employs the active sides of the engaging teeth to provide rolling contact. This permits snug tooth interengagement to provide zero backlash in the gearset.

A modified form of the gearset having rolling contact employs the outer circular surface (tops of teeth) of a helical gear as the rolling surface. The root circle surface of the toothed raceway provides the mating rolling surface. This type of gearset provides accurate tooth alignment and rolling contact for traction. One variation for dynamically balancing the drives comprises a drive shaft having an extended arm with a roller loosely mounted thereon. The roller contacts a race that is formed on the toothed wheel. Rotation of the drive shaft will cause the roller to impart centrifugal force to the toothed wheel thereby balancing the centrifugal force created by the toothed wheel. This reduces the forces exerted on the shaft and toothed wheel bearings thereby extending bearing life.

This invention provides means for increasing the coefficient of traction between the rolling contact surfaces to improve traction load capacities. To increase the coefficient of traction, the diameter of the rolling surfaces on the toothed wheel can be approximately $\frac{1}{2}\%$ to $\frac{3}{4}\%$ larger than the pitch diameter of the toothed wheels teeth (with a corresponding increase in the rolling surface diameter of the toothed raceway). As the toothed wheels rotate on the toothed raceways they will attempt to cover a greater track than the teeth will permit, thereby providing traction creep. Traction coefficient is proportional to creep up to about $\frac{1}{2}\%$ creep and reaches a maximum at about $\frac{3}{4}\%$ creep.

Accordingly it is an object of this invention to provide a high ratio drive that is compact, highly efficient and can operate with zero backlash.

Another object of this invention is to provide a high ratio drive wherein uniform rotation of the input shaft will transmit accurate non-uniform angular motion to the output shaft.

A further object of this invention is to provide a novel means for improving the coefficient of traction in a gearset having rolling contact.

Other objects and advantages will appear in the course of the following description.

DESCRIPTION OF THE EMBODIMENTS

Figure 1:
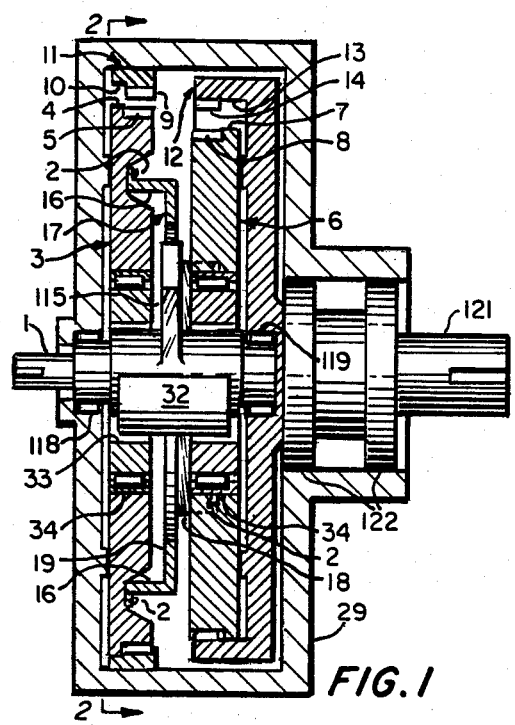
FIG. 1 is a side sectional view of one embodiment of this invention.
Figure 2:
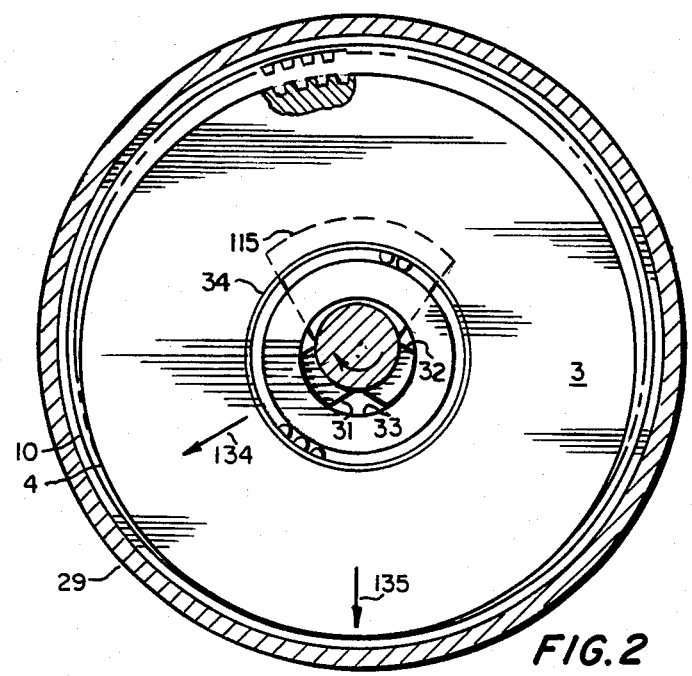
FIG. 2 is a sectional view taken on line 2—2 of FIG. 1.

Referring to FIGS. 1 and 2, housing 29 fixedly supports an annular toothed raceway 11, a second annular toothed raceway 12 is axially aligned with toothed raceway 11 and is secured to output shaft 121 that is rotatably supported by housing mounted roller bearings 122. Toothed wheels 3 and 6 are disposed within toothed raceways 11 and 12, respectively. Rolling surface 4 and teeth 5 on wheel 3 engage rolling surface 10 and teeth 9, respectively. Rolling surface 7 and teeth 8 on toothed wheel 6 engage rolling surface 13 and teeth 14, respectively. Wheels 3 and 6 are joined axially by flexible coupling 17 that comprises a support plate 19 having two sets of axially extending flexible leaves 16 and 18, disposed 90 degrees relative to each other. Set 16 is joined to toothed wheel 3 by screws 2, set 18 is joined to toothed wheel 6 by screws 2. Coupling 17 is torque rigid and generally stiff in construction, but permits slight relative radial movement between the toothed wheels 3 and 6. This permits accurate tooth alignment in the respective gearsets. Each wheel 3 and 6 centrally supports a roller bearing 34. Drive shaft 1 has two drive spokes 31 and 32 secured thereto and is supported for free rotation by housing mounted roller bearing 118 and by shaft mounted roller bearing 119. Drive shaft 1 and output shaft 121 are axially aligned with toothed raceway 11. The drive spokes 31 and 32 contact the bores 33 of roller bearings 34. Counter weight 115 is secured to drive shaft 1 and is diametrically opposite to drive spokes 31 and 32. This provides dynamic balance to the drive.

Figure 4:
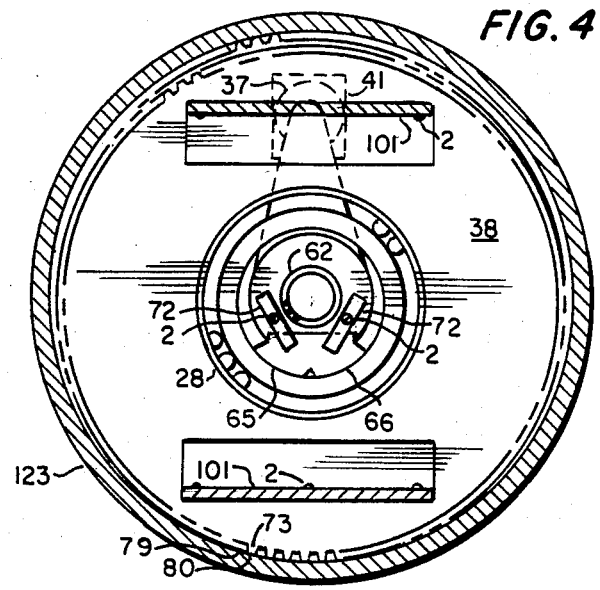
FIG. 4 is a sectional view taken on line 4—4 of FIG. 3.

In operation, clockwise rotation of drive shaft 1 causes drive spoke 31 to impart a radial drive force to toothed wheels 3 and 6 through their respective bearings 34. The force (indicated by arrow 134) causes toothed wheels 3 and 6 to act as levers, the pivot points being on rolling surfaces 10 and 13 (indicated by arrow 135). This driving force rotates toothed wheels 3 and 6 in union counterclockwise on their respective rolling surfaces 10 and 13, thereby rotating with differential motion toothed raceway 12 and output shaft 121 in the same direction as shaft 1. Spoke 32 stabilizes toothed wheels 3 and 6, but when shaft 1 is rotated in reverse spoke 32 provides the driving force and spoke 31 becomes the stabilizing spoke. The transmitted load is shared by the meshing teeth and traction provided by the rolling contact. The proportion of load shared between rolling contact and the teeth is determined by the contact angle of drive spoke 31. Contact pressure increases as spokes 31 and 32 are positioned closer to each other (as shown in FIG. 4) thereby increasing the load shared by the rolling elements. At a certain position the drive can operate solely by traction. With traction sharing the tooth load, the teeth can be smaller relative to torque capacity. The smaller teeth allow the pitch diameters of toothed wheels 3 and 6 to approach the pitch diameters of toothed raceway 11 and 12 thereby permitting higher ratios relative to size. Ratios over 40,000:1 are possible.

Figure 3:
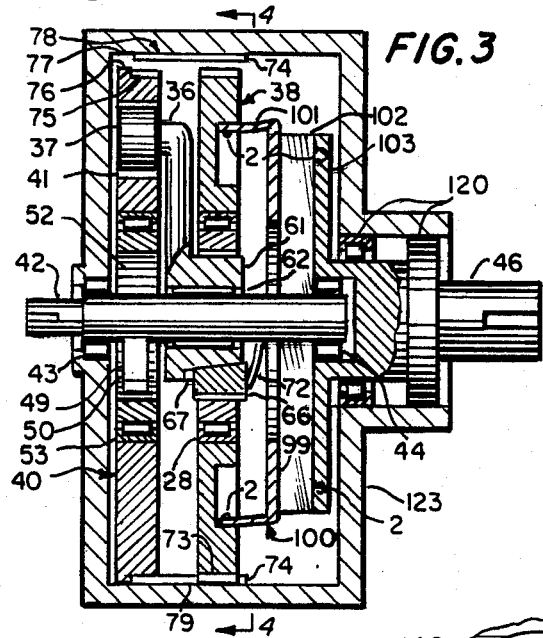
FIG. 3 is a side sectional view of a second embodiment of the invention.

FIGS. 3 and 4 show another form of the drive shown in FIGS. 1 and 2. This drive provides high ratio accurate nonuniform angular motion and can be used for applications employing stepping motors that require rapid response to high inertia loads with precision positioning accuracy. It can also be employed for indexing drives. Referring to FIGS. 3 and 4, housing 123 fixedly supports annular toothed raceway 78 comprising rolling surface 77 and axially extended helical teeth 74. Toothed wheel 40 has a rolling surface 76 and teeth 75. Toothed wheel 40 is disposed within toothed raceway 78 and has rolling contact and tooth interengagement therewith. Toothed wheel 38 is a modified form of the toothed wheel wherein the outer circle (tops of teeth) of helical teeth 73 contact the root circle 79 of toothed raceway 78 to provide rolling contact and tooth interengagement therewith. Although the teeth of the toothed wheel 38 provides non-continuous peripheral surface, the helical teeth tops 80 will provide continuous smooth line of contact as they roll on the root circle 79 of toothed raceway 78 (see enlarged view on FIG. 5). Drive shaft 42 is supported for free rotation by housing mounted roller bearing 43 and by roller bearing 44 mounted concentrically on output shaft 46. Drive spokes 49 and 50 are secured to drive shaft 42 and contact bore 52 of roller bearing 53 that is mounted in toothed wheel 40. Housing mounted roller bearings 120 rotatably supports output shaft 46. Flexible coupling 100 comprises, support plate 99 having two sets of axially extended leaves that are disposed 90 degrees relative to each other. Set 101 is joined to toothed wheel 38 by screws 2, set 102 is joined to square plate 103 by screws 2. Square plate 103 is secured to output shaft 46. Arm 36 is secured to stub shaft 61. The outer end of the arm has a roller 37 rotatably mounted thereon. Roller 37 is disposed within slot 41 on toothed wheel 40. The slot is just wide enough to permit roller 37 to oscillate radially as wheel 40 rotates. Needle bearing 62 is mounted within stub shaft 61. This permits arm 36 to have free rotation on drive shaft 42. Drive spokes 65 and 66 are keyed to be snug fitted on an axially ramped slot 67. Leaf springs 72 are secured to stub shaft 61 with screws 2. Bearing loading can be adjusted by varying the spring tension of the springs 72. Spring tension will urge keyed spokes inward. This will automatically compensate for bearing wear by keeping loading constant on shaft bearings 43, 44 and on roller bearing 28 mounted in toothed wheel 138.

In operation, clockwise rotation of drive shaft 42 will cause toothed wheel 40 to rotate counterclockwise on toothed raceway 78 (similar in operation to toothed wheel 3 on toothed raceway 11 shown in FIGS. 1 and 2). Rotation of toothed wheel 40 will rotate arm 36 by transmitting a force from slot 41 to roller 37. The arm will rotate attached stub shaft 61 and drive spokes 65 and 66. Drive spokes will drive toothed wheel 38 clockwise on toothed raceway 78 and have rolling contact and tooth interengagement therewith. The flexible coupling 100 will accommodate the radial displacements of the eccentric rotation of toothed wheel 38 by the flexing of the leaves 101 and 102. This type of coupling is suitable for accommodating small radial displacements. Conventional flexible couplings can be employed for ratios requiring larger displacements. Coupling 100 will transmit torque from the toothed wheel 38 to output shaft 46. Slot 41 is disposed eccentrically on toothed wheel 40, therefore the torque and motion transmitted to arm 36 and drive spokes 65 and 66 will be nonuniform. As an example, when slot 41 is positioned opposite to the point of contact between toothed wheel 40 and toothed raceway 78 (as shown in FIG. 3) the highest speed and lowest torque will be transmitted to arm 36 from toothed wheel 40. When slot 41 falls closest to the point of contact between toothed wheel 40 and toothed raceway 78 the highest torque and slowest motion is transmitted thereto. In this position lockup will occur (cannot be backdriven). This holding action is highly desirable for stepping motor applications. If a stepping motor is coupled to drive shaft 42 and detented to start at the high torque position, a single rotation of drive shaft 42 will advance arm 36 1.8 degrees or 1/200 of a revolution, when the ratio between toothed wheel 40 and toothed raceway 78 is 200:1. Rotation of arm 36 will in turn rotate toothed wheel 38 on toothed raceway 78 to further increase the output ratio. If the ratio between toothed wheel 38 and toothed raceway 78 is 200:1, the ratio transmitted to output shaft 46 would be 40,000:1. Of course if only the first stage reduction is required, stub shaft 61 can be the output shaft, therefore toothed wheel 38, coupling 100 and output shaft 46 can be eliminated.

This invention provides means for increasing the coefficient of traction between the rolling contact surfaces to improve traction load capacities. Traction coefficient is proportional to creep up to about ½% creep and reaches a maximum at about ¾% creep. Referring to FIGS. 1 and 2, toothed wheel 3 has a rolling surface 4 that radially extends slightly beyond the outside diameter of teeth 5. The diameter of the rolling surface 4 can be about ¼% to ¾% greater than the pitch diameter of the teeth 5 depending on the amount of creep desired. The diameter of rolling surface 10 on the toothed raceway 11 extends slightly beyond the root circle of teeth 9. The desired working depth between the meshing teeth will determine the exact diameter of rolling surface 10. Due to the fact that the diameter of rolling surface 4 is greater than the diameter of the pitch circle of teeth 5, wheel 3 upon rotation will attempt to cover a greater track than the teeth 5 will permit, thereby providing the desired creep (commonly called slip which is erroneous).

Figures 5, 6:
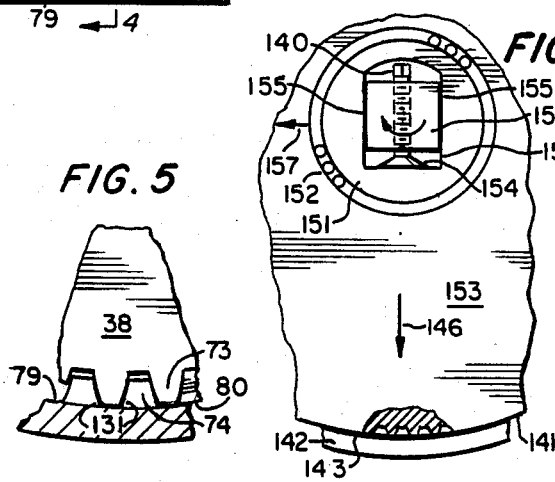
FIG. 5 is a fragmentary view of a modified form of the toothed wheel and toothed raceway.
FIG. 6 is a fragmentary view of toothed wheel showing a modified form of the drive member.

FIG. 5 shows in detail the toothed wheel 38 and toothed raceway 78 as shown in FIGS. 3 and 4. This is another means of increasing the coefficient of traction. The outside circular surface (tops of teeth) 80 of toothed wheel 38 provides the rolling surface. The root circle on toothed raceway 78 provides the mating rolling surface 79. The slight gaps 131 near the base of teeth 74 provide the little clearance needed to permit creep. The creep between the meshing teeth is only a few thousandths of an inch.

Figure 7:
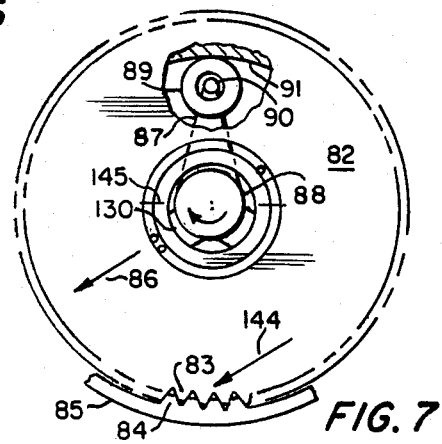
FIG. 7 is a fragmentary view of a second modified form of the toothed wheel and toothed raceway.

FIG. 7 shows another form of a gearset having rolling contact wherein the teeth alone provide the rolling contact. Toothed wheel 82 and teeth 83 are radially free to ride on the contacting sides of teeth 84 and toothed raceway 85. This allows the teeth to have a zero backlash mesh and to accommodate the runout errors that commonly present problems of tooth alignment in the conventional gearsets. This gearset will operate with spur or helical gears. The angle of drive spoke 130 (represented by arrow 86) will determine the amount of radial force wheel 82 will have on the meshing teeth 83 and 84. If the spoke angle is parallel to the pressure angle (indicated by arrow 144) of teeth 83 there will be little or no radial force exerted on the meshing teeth. If the drive spoke 130 is set to point closer to the point of contact of the meshing teeth 83 and 84, a greater radial force is exerted on the meshing teeth. When the spokes are positioned 90 degrees (indicated by line 145) relative to point of contact of the meshing teeth, the toothed wheel will be fully suspended eccentrically on drive shaft 88 and will operate as a conventional gear without the advantages of rolling contact. Arm 87 is connected to drive shaft 88 and loosely supports roller 89 on pin 90 which is secured to arm 87. When shaft 88 is rotated roller 89 will roll on race 91 to dynamically balance wheel 82. This will reduce the centrifugal force exerted on the teeth 84 of toothed raceway 85. This balancing means can also be employed on the drives shown in FIGS. 1, 2, 3 and 4 to reduce the centrifugal force imposed on the drive shaft and wheel bearings.

This gearset form can be employed in the drive shown in FIGS. 1, 2, 3 and 4, but is especially suited for the slow speed stage shown on FIG. 4. It can also operate as a single stage drive by connecting toothed wheel 82 to an output shaft with a flexible coupling (an arrangement similar to the second stage shown in FIG. 3).

The various forms of gearsets and drive members shown and described in each of the figures can be employed or interchanged within the drives shown and described in FIGS. 1, 2, 3 and 4.

FIG. 6 shows another form of the drive member that helps overcome the common major problem of tooth misalignment in a gearset. A fragmented portion of a toothed wheel 153 is shown mounted on a squared portion of drive shaft 150 by roller bearing 152. The inner race 151 has a centrally disposed groove 156 that is generally square. The parallel sides 155 of groove 156 have a snug fit contact with drive shaft 150. This permits relative radial movement between drive shaft 150 and toothed wheel 153. Adjusting screw 140 is tight against the spring washer 154 to provide a contacting force between rolling surface 141 of toothed wheel 153 and rolling surface 143 of toothed raceway 142. Rotation of drive shaft 150 will impart a driving force to toothed wheel 153 at a right angle (indicated by arrow 157) relative to the contact point between the rolling surface 141 and 143 (indicated by arrow 146). As toothed wheel 153 is rotated on toothed raceway 142, it is radially free to follow the exact contour of rolling surface 143. This accomodates the runout errors, such as gear and bearing eccentricities, gear mounting errors, shaft deflections, etc., thereby providing accurate tooth meshing in the gearset. Accurate tooth alignment provides uniform angular motion, greater torque capacity and quiet operation.

It is accordingly to be understood that various changes and modifications may be made, in the forms illustrated, by those skilled in the art without departing from the spirit and scope of the present invention, as defined by the appended claims.

What is claimed as invention is:

1. A high ratio drive comprising, a housing fixedly supporting a first annular toothed raceway having rolling surface means, said housing rotatably supporting an output shaft concentrically secured to a second annular toothed raceway having rolling surface means, the first and second toothed raceways being axially aligned, a pair of axially coupled toothed wheels having rolling surface means, said toothed wheels disposed within said first and second toothed raceways, respectively, so as to have rolling contact and tooth interengagement therewith, rolling element bearing means mounted concentrically in said toothed wheels, a drive shaft axially aligned with said output shaft and rotatably supported by said housing, said drive shaft having a drive member connected thereto, said drive member engaging the inner race bore of said bearing means, radially moveable guide means connect said drive member and said inner race, resilient means connect said drive member and said inner race, thereby radially biasing said rolling element bearing means, whereby rotation of said drive shaft will cause the drive member to impart a radial driving force to said pair of toothed wheels.

2. A device as in claim 1 including balancing means comprising, a roller connected to said drive shaft for rotation therewith, inner concentric raceway means disposed on said toothed wheels, said roller engaging the inner concentric raceway means at a point diametrically opposed to the point of engagement between the toothed wheels and the fixed annular toothed raceways.

3. A high ratio drive comprising, a housing fixedly supporting a first annular toothed raceway having rolling surface means, said housing rotatably supporting an output shaft concentrically secured to a second annular toothed raceway having rolling surface means, the first and second toothed raceways being axially aligned, a pair of toothed wheels having rolling surface means, said toothed wheels disposed within said first and second toothed raceways, respectively, so as to have rolling contact and tooth interengagement therewith, a torque rigid coupling having radially flexible members, said flexible members being secured to each said toothed wheel so as to provide unified rotation, but relative radial movement between the toothed wheels, a rolling element bearing mounted concentrically in each said toothed wheel, a drive shaft axially aligned with said output shaft and rotatably supported by said housing, said drive shaft having a drive member connected thereto, said drive member engaging the inner race bore of each said bearing, whereby rotation of said drive shaft will cause the drive member to impart a radial driving force to said pair of toothed wheels.

4. A device as in claim 3 wherein said drive member comprises at least one radially projecting member secured to said drive shaft.

5. A torque transmitting gear set having rolling contact with an effective coefficient of traction comprising, a rotatably supported drive gear having a rolling surface, a reaction gear having a rolling surface, means for mounting said reaction gear, said drive gear having rolling contact and tooth interengagement with said reaction gear, the diameter of the rolling surface of said drive gear being $\frac{1}{8}\%$ to 2% larger than its pitch diameter, the diameter of the rolling surface of the reaction gear being larger than its pitch diameter so as to correspond to the diametrical increase of the rolling surface of said drive gear, means for loading said rolling surfaces, whereby rotation of said drive gear will produce a driving slipping action or creep between said rolling surfaces.

6. A high ratio drive comprising, a housing fixedly supporting a first annular toothed raceway having rolling surface means, said housing rotatably supporting an output shaft concentrically secured to a second annular toothed raceway having rolling surface means, the first and second toothed raceways being axially aligned, a pair of axially coupled toothed wheels having rolling surface means, said toothed wheels disposed within said first and second toothed raceways, respectively, so as to have rolling contact and tooth interengagement therewith, the radius of the rolling surface of each said wheel extending beyond the pitch circle of its teeth, the radius of the rolling surface of said annular toothed raceways being such as to provide proper working depth between the interengaging teeth, whereby rotation of said toothed wheels will produce a driving slipping action or creep between the contacting rolling surfaces, rolling element bearing means mounted concentrically in said toothed wheels, a drive shaft axially aligned with said output shaft and rotatably supported by said housing, said drive shaft having a drive member connected thereto, said drive member engaging the inner race bore of said bearing means, whereby rotation of said drive shaft will cause the drive member to impart a radial driving force to said pair of toothed wheels.

* * * * *